US009758421B2

(12) United States Patent
Schnabel, Jr. et al.

(10) Patent No.: US 9,758,421 B2
(45) Date of Patent: Sep. 12, 2017

(54) GLASS SHEET PROCESSING SYSTEM HAVING COOLING OF CONVEYOR ROLLER ENDS

(71) Applicants: GLASSTECH, INC., Perrysburg, OH (US); Aileen Mumford, Ottawa Lake, MI (US)

(72) Inventors: James P. Schnabel, Jr., Holland, OH (US); Eustice H. Mumford, Ottawa Lake, MI (US); David B. Nitschke, Perrysburg, OH (US)

(73) Assignee: GLASSTECH, INC., Perrysburg, OH (US)

( * ) Notice: Subject to any disclaimer, the term of this patent is extended or adjusted under 35 U.S.C. 154(b) by 0 days.

(21) Appl. No.: 14/929,763

(22) Filed: Nov. 2, 2015

(65) Prior Publication Data

US 2017/0121212 A1    May 4, 2017

(51) Int. Cl.
  *C03B 35/18*   (2006.01)
  *C03B 35/16*   (2006.01)
  *B65G 13/11*   (2006.01)
  *B65G 39/09*   (2006.01)

(52) U.S. Cl.
  CPC ............ *C03B 35/184* (2013.01); *B65G 13/11* (2013.01); *B65G 39/09* (2013.01); *C03B 35/16* (2013.01); *B65G 2207/22* (2013.01)

(58) Field of Classification Search
  CPC .. F25D 25/28; F27B 9/2407; B65G 2201/022
  USPC .......... 198/780, 788, 789, 952; 62/440, 197, 62/370.1; 65/197, 370.1
  See application file for complete search history.

(56) References Cited

U.S. PATENT DOCUMENTS

| 1,615,834 | A | 2/1927 | Gelstharp |
| 1,992,998 | A | 3/1935 | Drake |
| 2,571,239 | A | 10/1951 | Hart |
| 3,165,391 | A | 1/1965 | Schmid |
| 3,806,312 | A | 4/1974 | McMaster et al. |
| 3,936,291 | A | 2/1976 | McMaster et al. |
| 3,947,242 | A | 3/1976 | McMaster et al. |
| 3,994,711 | A | 11/1976 | McMaster |
| 4,204,854 | A | 5/1980 | McMaster et al. |
| 4,222,763 | A | 9/1980 | McMaster |

(Continued)

FOREIGN PATENT DOCUMENTS

| CN | 202955970 U | * 5/2013 |
| GB | 958583 | 5/1964 |

OTHER PUBLICATIONS

PCT Transmittal of International Search Report and Written Opinion of the International Searching Authority Dated Jan. 9, 2017, Application No. PCT/US16/56498, Applicant Glasstech, Inc. 7 Pages.

*Primary Examiner* — Leslie A Nicholson, III
*Assistant Examiner* — Lester Rushin
(74) *Attorney, Agent, or Firm* — Brooks Kushman P.C.

(57) ABSTRACT

A hot glass sheet processing system includes a conveyor roller support structure (34) located within a heated location (32) and has an elongated cooling unit (36) having a housing (38) defining a cooling chamber (40) that receives and has bearings (42) that rotatably support an aligned set of roller ends (30). The cooling unit includes a cooling circuit that supplies cooling fluid to the cooling chamber (40) to provide cooling of the aligned set of roller ends (30) and the bearings (42).

11 Claims, 5 Drawing Sheets

(56) References Cited

U.S. PATENT DOCUMENTS

| | | | |
|---|---|---|---|
| 4,282,026 | A | 8/1981 | McMaster et al. |
| 4,404,011 | A | 9/1983 | McMaster |
| 4,437,871 | A | 3/1984 | McMaster et al. |
| 4,470,838 | A | 9/1984 | McMaster et al. |
| 4,512,460 | A | 4/1985 | McMaster |
| 4,525,193 | A | 6/1985 | McMaster et al. |
| 4,575,390 | A | 3/1986 | McMaster |
| 4,661,141 | A | 4/1987 | Nitschke et al. |
| 4,662,925 | A | 5/1987 | Thimons et al. |
| 4,946,491 | A | 8/1990 | Barr |
| 5,004,491 | A | 4/1991 | McMaster et al. |
| 5,330,550 | A | 7/1994 | Kuster et al. |
| 5,376,158 | A | 12/1994 | Shetterly et al. |
| 5,385,786 | A | 1/1995 | Shetterly et al. |
| 5,472,470 | A | 12/1995 | Kormanyos et al. |
| 5,900,034 | A | 5/1999 | Mumford et al. |
| 5,906,668 | A | 5/1999 | Mumford et al. |
| 5,917,107 | A | 6/1999 | Ducat et al. |
| 5,925,162 | A | 7/1999 | Nitschke et al. |
| 6,032,491 | A | 3/2000 | Nitschke et al. |
| 6,079,094 | A | 6/2000 | Ducat et al. |
| 6,173,587 | B1 | 1/2001 | Mumford et al. |
| 6,227,008 | B1 | 5/2001 | Shetterly et al. |
| 6,418,754 | B1 | 7/2002 | Nitschke et al. |
| 6,513,348 | B2 | 2/2003 | Shetterly et al. |
| 6,543,255 | B2 | 4/2003 | Bennett et al. |
| 6,578,383 | B2 | 6/2003 | Bennett et al. |
| 6,718,798 | B2 | 4/2004 | Nitschke et al. |
| 6,729,160 | B1 | 5/2004 | Nitschke et al. |

\* cited by examiner

GLASS SHEET PROCESSING SYSTEM HAVING COOLING OF CONVEYOR ROLLER ENDS

TECHNICAL FIELD

This invention relates to a glass sheet processing system having a conveyor including rollers with roller ends that are cooled within a heated environment of the system.

BACKGROUND

Glass sheets are conventionally formed by heating on a conveyor within a furnace and then forming within a heated chamber prior to delivery for cooling. Such cooling can be slow cooling to provide annealing, faster cooling that provides heat strengthening, or rapid cooling that provides tempering. In connection with heating of the glass sheets, see U.S. Pat. No. 3,806,312 McMaster et al.; U.S. Pat. No. 3,947,242 McMaster et al.; U.S. Pat. No. 3,994,711 McMaster; U.S. Pat. No. 4,404,011 McMaster; and U.S. Pat. No. 4,512,460 McMaster. In connection with glass sheet forming, see U.S. Pat. No. 4,204,854 McMaster et al.; U.S. Pat. No. 4,222,763 McMaster; U.S. Pat. No. 4,282,026 McMaster et al.; U.S. Pat. No. 4,437,871 McMaster et al.; U.S. Pat. No. 4,575,390 McMaster; U.S. Pat. No. 4,661,141 Nitschke et al.; U.S. Pat. No. 4,662,925 Thimons et al.; U.S. Pat. No. 5,004,491 McMaster et al.; U.S. Pat. No. 5,330,550 Kuster et al.; U.S. Pat. No. 5,376,158 Shetterly et al.; U.S. Pat. No. 5,472,470 Kormanyos et al.; U.S. Pat. No. 5,900,034 Mumford et al.; U.S. Pat. No. 5,906,668 Mumford et al.; U.S. Pat. No. 5,925,162 Nitschke et al.; U.S. Pat. No. 6,032,491 Nitschke et al.; U.S. Pat. No. 6,173,587 Mumford et al.; U.S. Pat. No. 6,227,008 Shetterly; U.S. Pat. No. 6,418,754 Nitschke et al.; U.S. Pat. No. 6,543,255 Bennett et al.; U.S. Pat. No. 6,578,383 Bennett et al.; U.S. Pat. No. 6,718,798 Nitschke et al.; U.S. Pat. No. 6,729,160 Nitschke et al. In connection with the cooling, see U.S. Pat. No. 3,936,291 McMaster; U.S. Pat. No. 4,470,838 McMaster et al.; U.S. Pat. No. 4,525,193 McMaster et al.; U.S. Pat. No. 4,946,491 Barr; U.S. Pat. No. 5,385,786 Shetterly et al.; U.S. Pat. No. 5,917,107 Ducat et al.; U.S. Pat. No. 6,079,094 Ducat et al.; and U.S. Pat. No. 6,513,348 Bennett et al.

Rollers utilized to convey glass sheets may include sinter bonded fused silica which is capable of operating without thermal warpage upon heating to the relatively high temperatures that can be involved, normally in excess of 600° C. However, this high temperature results in bearing problems and can also cause problems for mounting of metal end caps utilized to support the rollers for rotation.

SUMMARY

An object of the present invention is to provide an improved hot glass sheet processing system.

In carrying out the above object, a hot glass sheet processing system constructed according to the present invention includes a roller conveyor extending along a direction of conveyance of the processing system and including a plurality of rollers having a set of roller ends that are located within a heated location of the system and aligned with each other along the direction of conveyance. The process system also includes a roller support structure located within the heated location of the system and having an elongated cooling unit including a housing defining a cooling chamber that receives and has bearings that rotatably support the aligned set of roller ends. The cooling unit including a cooling circuit that supplies cooling fluid to the cooling chamber to provide cooling of the aligned set of roller ends and cooling of the bearings.

As disclosed, the cooling circuit supplies a liquid that provides the cooling of the aligned set of roller ends and the bearings. The liquid used is water that provides the cooling of the aligned set of roller ends and the bearings and, more specifically, a mixture of the water and an antifreeze that provides the cooling of the aligned set of roller ends and the bearings.

The roller support structure disclosed also includes an air supply that prevents heated air of the processing system from flowing into the cooling unit and heating the aligned set of roller ends and the bearings.

As also disclosed, the roller support structure includes round cans that project into the cooling chamber and have respective open ends through which the aligned set of roller ends respectively project into the cooling chamber. The round cans supporting the bearings which rotatably support the aligned set of roller ends, and the housing of the cooling unit and the open ended round cans defining a flow path of the cooling circuit that supplies water for cooling the aligned set of roller ends and the bearings.

The aligned set of roller ends have end caps respectively secured thereto, and the end caps have support projections that are respectively rotatably supported by the bearings. Also, the air supply provides air into the round cans to prevent heated air of the processing system from flowing into the cooling unit between the round cans and the aligned set of roller ends to prevent heating of the end caps and the bearings.

The objects, features and advantages of the present invention are readily apparent from the following detailed description of the preferred embodiment when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
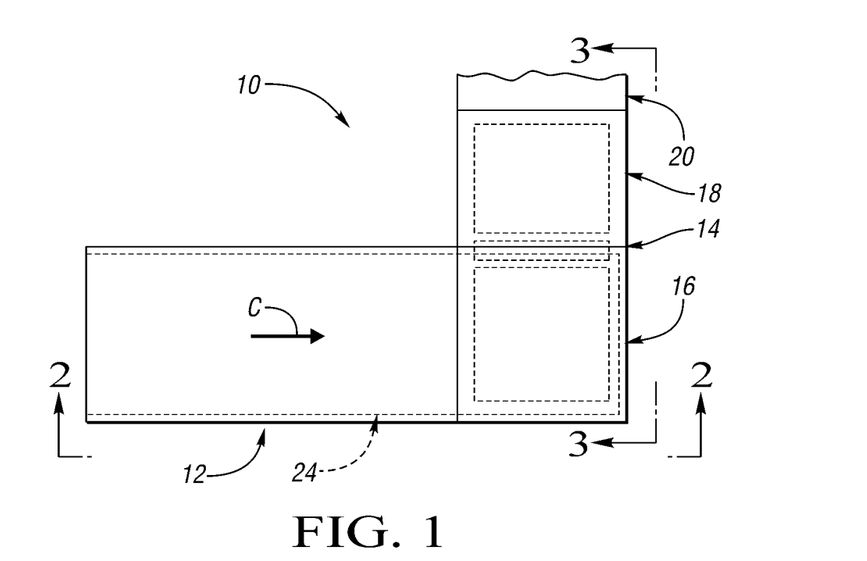
FIG. 1 is a schematic top plan view of a glass sheet processing system that embodies the present invention.
Figure 2:
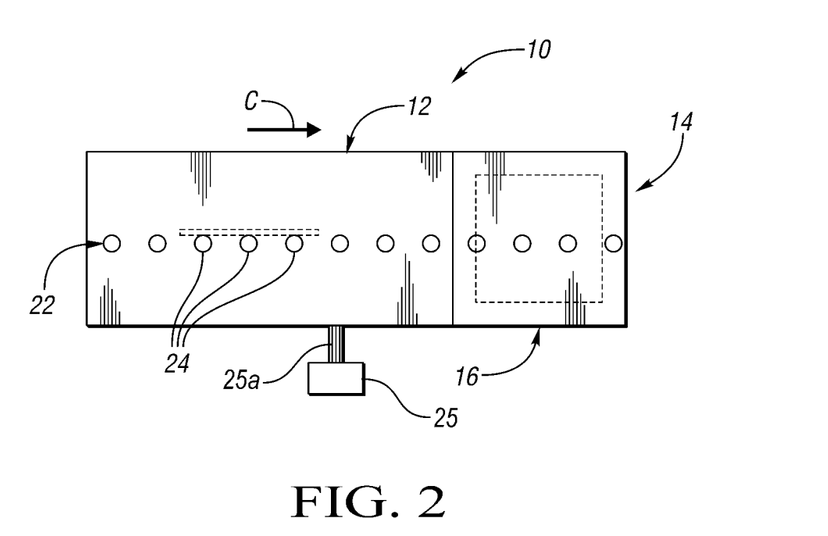
FIG. 2 is a schematic side elevational view of the processing system taken along the direction of line 2-2 in FIG. 1.
Figure 3:
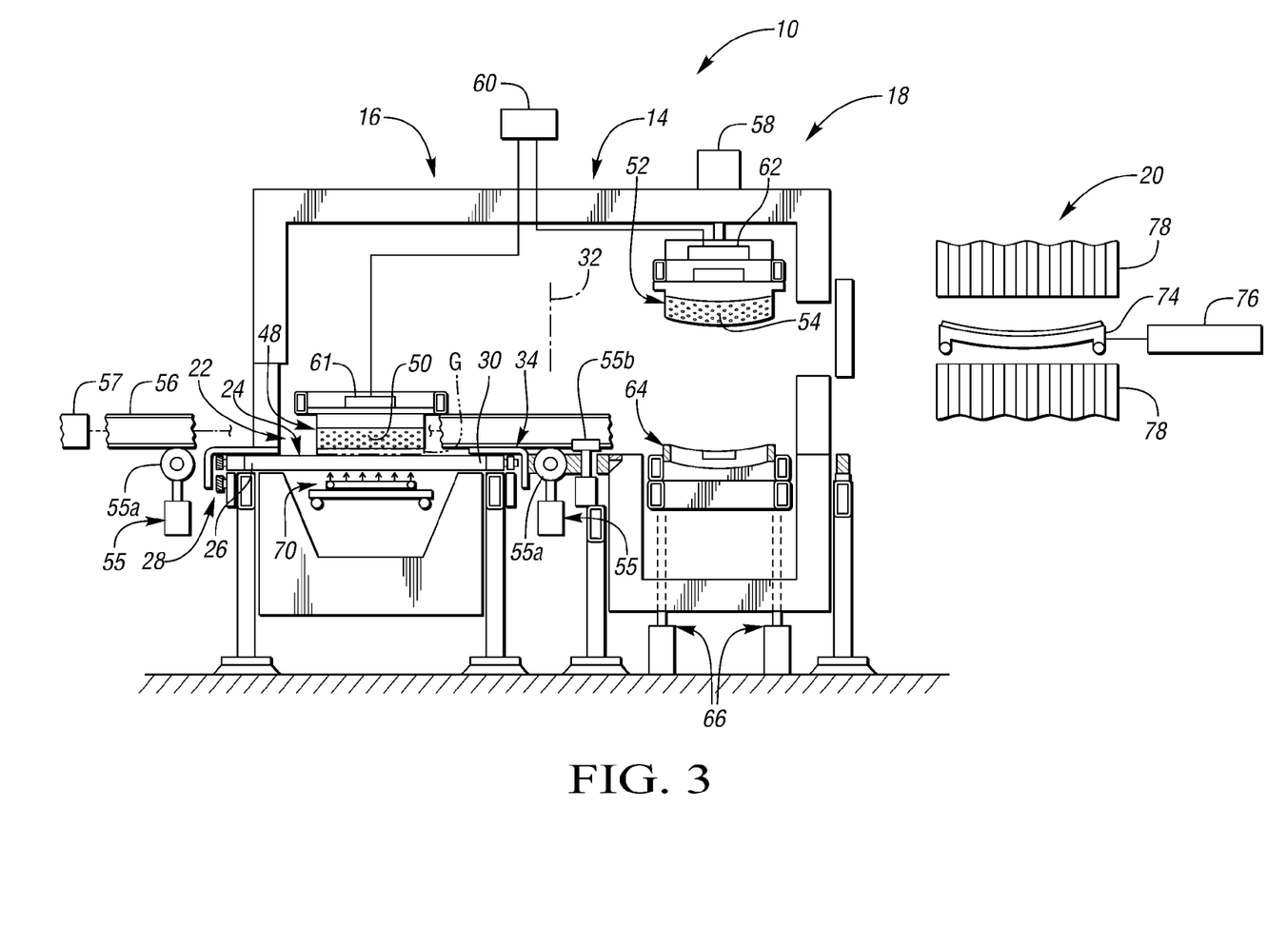
FIG. 3 is a schematic elevational end view of the processing system taken along the direction of line 3-3 in FIG. 1 and illustrates a forming station having a roller conveyor cooling unit of the invention as well as having first and second forming sections with forming molds utilized to provide glass sheet forming within the heated environment of the system.

With reference to FIGS. 1-3, a glass sheet processing system generally indicated by 10 embodies the present invention and includes a heating furnace 12, a forming station 14 including first and second forming locations 16 and 18, and a cooling station 20 for cooling a formed glass sheet G by slow cooling for annealing, faster cooling for heat strengthening or more rapid cooling for tempering. The furnace 12 and the first forming section 16 of the forming station 14 include a roller conveyor 22 having conveyor rollers 24 for conveying a glass sheet G along a direction of conveyance C for heating. The rollers 24 are made of sintered bonded fused silica particles so as to have resistance to thermal warpage during heating and cooling and thus providing planarity of the glass sheet during the conveyance. All of the components of the processing system 10 are controlled by a controller 25 through a control bundle 25a of wires, optical fibers, tubes, etc. as schematically shown in FIG. 2.

Figure 4:
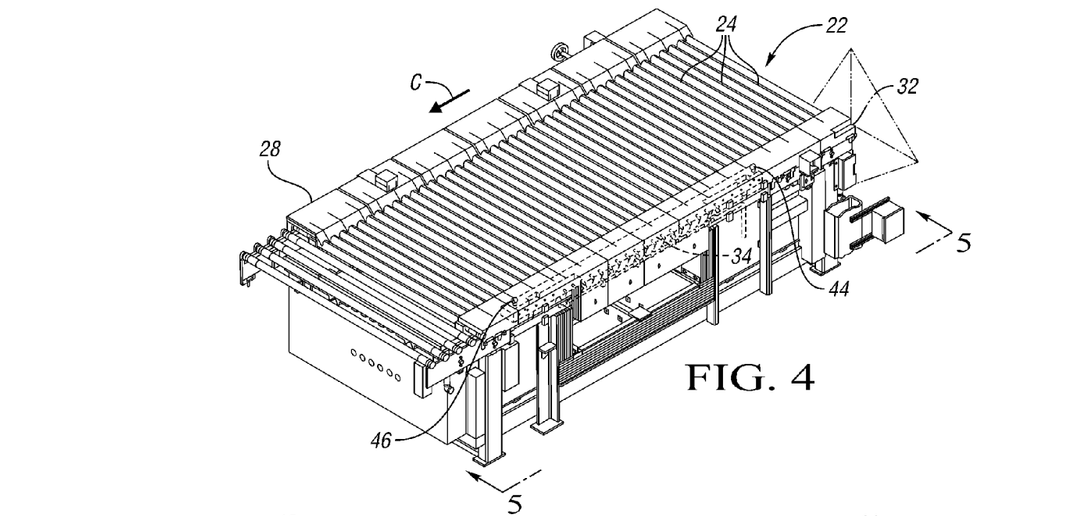
FIG. 4 is a perspective view illustrating a housing of the system with its upper portion removed to show the cooling unit which provides cooling of conveyor roller ends at a heated location within the system housing.
Figure 5:
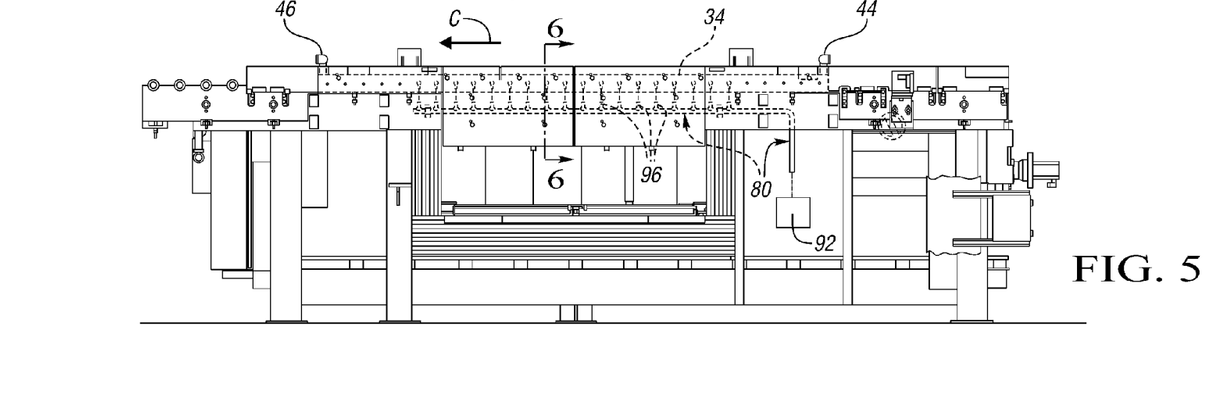
FIG. 5 is an elevational view taken along the direction of line 5-5 in FIG. 4 to further illustrate the cooling unit.

As shown in FIG. 3, each roller 24 has one end 26 that can extend outwardly of the furnace to be rotatively driven by a schematically illustrated drive mechanism 28, while another end 30 of each roller is located at a heated location adjacent the junction 32 between the first and second sections 16 and 18 of the forming station 14 and are received by a roller support structure 34 schematically illustrated in FIG. 3. More specifically, the support structure 34 as illustrated in FIGS. 4 and 5 has an elongated shape along the direction of conveyance C and includes an elongated cooling unit 36 shown in FIG. 6 as including a housing 38 defining a cooling chamber 40 that receives and has bearings 42 that rotatably support the aligned set of roller ends 30. The cooling unit 42 as best shown in FIG. 5 includes an inlet 44 and an outlet 46 through which cooling fluid is supplied to the cooling chamber to provide cooling of the aligned set of roller ends 30 and cooling of the bearings 42 during operation of the system.

In the specific processing system 10 as illustrated in FIG. 3, forming of the glass sheet is performed with the conveyor roll ends 30 cooled within the support structure 34 as is hereinafter more fully described. More specifically, this system has the forming station 14 with its first forming section 16 having a first upper mold 48 including a downwardly facing forming face 50 that is curved along the direction of conveyance C but has straight line elements transverse to the direction of conveyance, and the second forming section 18 has a second upper mold 52 that has a downwardly facing forming face 54 that is curved both along and transverse to the direction of conveyance C. Actuators 55 have rollers 55a that support beams 56 (only one shown) on which the first upper mold 48 is supported and moved vertically a slight extent by operation of the actuators 55 during the forming operation, and an actuator 57 moves the beams 56 and the first upper mold 48 on the beams horizontally between the first and second forming sections 16 and 18 of the forming station 14 during the forming operation. Lateral rollers 55b also contact the beams 56 to provide lateral positioning during movement of the first upper mold 38 between its pickup position in FIG. 3 and its delivery position in FIG. 3a.

Furthermore, an actuator 58 moves the second upper mold 52 vertically during the forming cycle of the forming station 14 and a source of pressurized air 60 supplies pressurized air to first and second gas pumps 61 and 62 to provide a vacuum and at other times pressurized air through arrays of holes in the forming faces 50 and 54 of the first and second upper molds 48 and 52 to initially support and subsequently release glass sheets G being formed. Also, a lower mold 64 in the second forming section 14 of the forming station is supported for vertical movement by jacks 66 during the forming. This vertical movement can be downward to allow the first upper mold 38 to move over the lower mold 64 and then upward so the release of the glass sheet is at a more closely spaced relationship to the lower mold to control positioning. In addition, the vertical movement of the lower mold 64 can also be used in cooperation with the vertical movement of the second upper mold 52 to perform press bending. In addition, a gas jet pump array 70 provides lifting of a heated glass sheet G from the roller conveyor 22 to the first upper mold 48 to commence the forming cycle as is hereinafter described.

In addition to the forming station 14, the system 10 as shown in FIG. 3 includes a cooling station 20 to which a formed glass sheet G is moved on a delivery mold 74 by an actuator 76 from the second forming section 18 to the cooling station between lower and upper quench heads 78 for cooling. As also previously mentioned, this cooling can be slow cooling for annealing, more rapid cooling for heat strengthening, or rapid cooling for tempering.

Figure 3A:
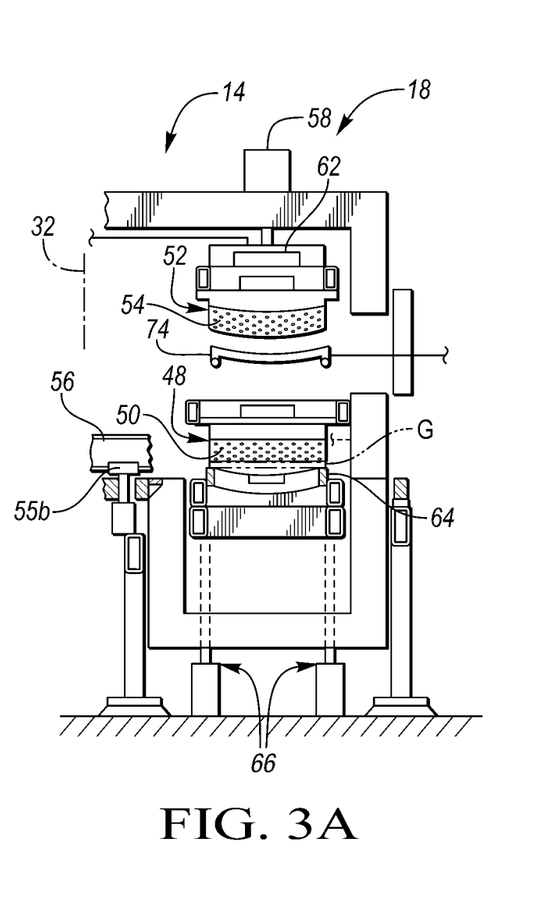
FIG. 3a is a partial elevation view showing the right second forming section of the forming station of FIG. 3 but after an initially formed glass sheet has been moved thereto on a first upper mold from the left first forming station to a position above a lower mold and below a second upper mold that has released a formed glass sheet from a prior cycle onto a delivery mold that is subsequently moved out of the forming station for delivery.
Figure 3B:
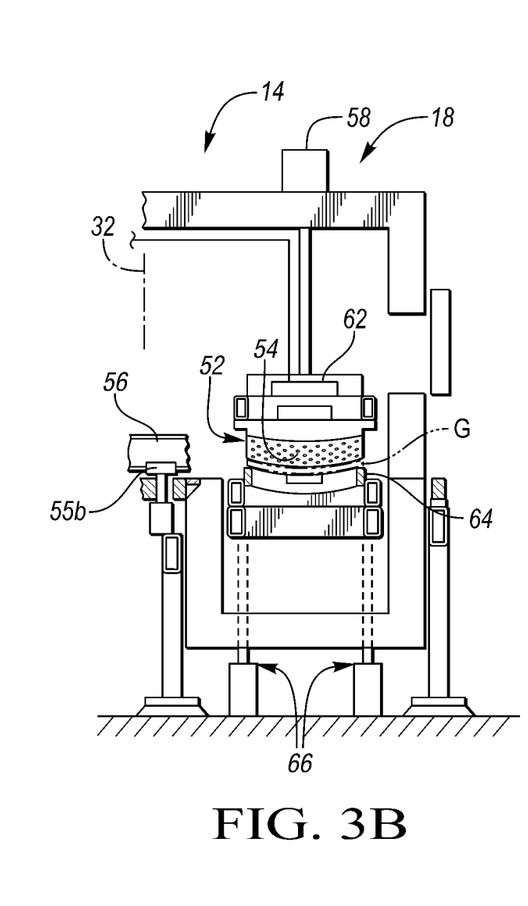
FIG. 3b is another partial view of the right second forming section of the forming station of FIG. 3 but showing the glass sheet during press forming between the lower mold and the second upper mold.

The forming station 14 illustrated in FIGS. 3, 3a and 3b has three stages of operation wherein the glass sheet is formed on the first upper mold 48 with curvature in a first direction and straight line elements in a second direction transverse to the first direction, by gravity in transverse directions on the lower mold 64, which has an open center ring shape, after receipt thereby from the first upper mold 48 in its delivery position shown in FIG. 3a, and finally by the press forming between the second upper mold 52 and the lower mold 64 as shown in FIG. 3b.

A cycle of operation of the forming station 14 with reference to FIG. 3 begins by downward movement of the first upper mold 48 within the left first forming section 16 so that a glass sheet G can be lifted off of the roller conveyor 22 by vacuum applied to the face 50 of the first upper mold 48 and upward gas flow from the gas jet pump array 70. More specifically, the first upper mold 48 can be moved downwardly by actuators 55 to about one half inch (12 to 15 mm) from the conveyor 22 for the initial pickup of the glass sheet and can then be moved upwardly so the first upper mold can move above support structure 34. The actuator 57 then moves the beams 56 and the first upper mold 48 to the right into the second forming section 18 of the forming station to the location shown in FIG. 3a above the lower mold 64 and below the raised upper mold 52 that is shown above the delivery mold 74 that is then still operating in the prior cycle. The positioning of the first upper mold 48 and delivery mold 74 at different elevations within the second forming section 18 at the same time provides overlapping cycles that reduces the system cycle time and thus provides greater output that advantageously reduces the cost of the final formed glass sheet product.

After the lower mold 64 receives the glass sheet, the first upper mold 48 moves back to the first forming section 16 as shown in FIG. 3 in preparation for the next cycle and the glass sheet G is press formed between the second upper mold 52 and the lower mold 64 as shown in FIG. 3b. Subsequently the second upper mold 52 moved upwardly to the position of FIG. 3a with the press formed glass sheet supported thereby and the delivery mold 74 is moved into the second forming section 14 as shown to receive the press formed glass sheet for subsequent movement to the quench 20 shown in FIG. 3.

It should be appreciated that the support structure 34 and cooling unit 36 thereof can also be used in other systems having heated locations in addition to the forming station disclosed for which the support structure and cooling unit have particular utility. For example, the forming station 14 may alternatively have a first upper mold that only moves vertically and a lower mold that moves horizontally from below the first upper mold to below a second upper mold at an elevation below the elevation of a delivery mold that delivers the formed glass sheet after press forming between the lower mold and the second upper mold as disclosed by United States Patent Application Publication No. U.S. 2015/0218029 A1, the entire disclosure of which is hereby incorporated by reference.

Figure 6:
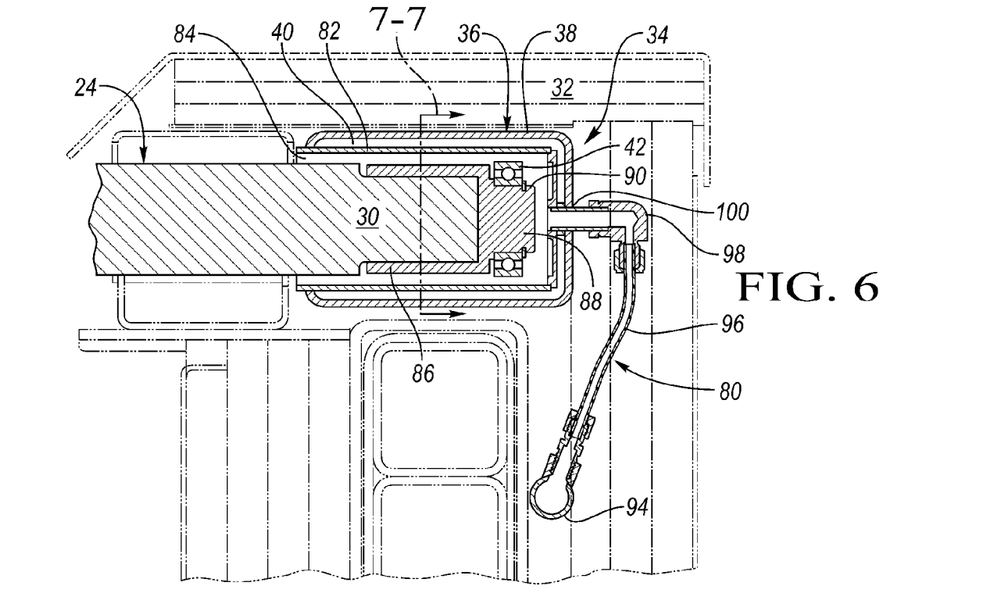
FIG. 6 is a sectional view taken along the direction of line 6-6 in FIG. 5 to further illustrate the construction of the cooling unit.
Figure 7:
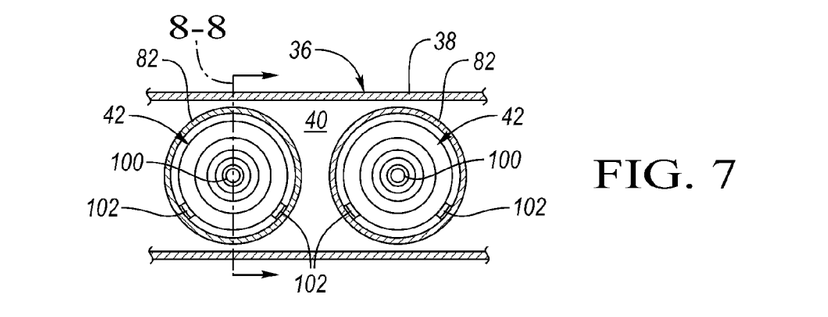
FIG. 7 is a sectional view taken through the cooling unit along the direction of line 7-7 in FIG. 6.

In the preferred construction of the cooling unit 36, the cooling circuit is provided by the cooling chamber 40 shown in FIG. 6 and by the inlet 44 and outlet 46 shown in FIG. 5. A fluid preferably provided by a liquid flowing through the circuit provides the cooling of the aligned set of roller ends 30 of the conveyor rollers 24 and cooling of the associated bearings 42 as shown in FIGS. 6 and 7. More specifically, as disclosed, water is the liquid utilized and is preferably provided as a mixture of water and an antifreeze to provide the cooling of the aligned set of roller ends 30 and the bearings 42. The antifreeze prevents freezing upon cooling in an outside cooler after passage through the system and also prevents sediment buildup in the cooling circuit by anti-sediment additives of the antifreeze.

With reference to FIGS. 5 and 6, the roller support structure 34 includes an air supply collectively indicated by 80 that prevents heated air of the processing system from flowing into the cooling unit 36 and heating the aligned set of roller ends 30 and the bearings 42. More specifically, the roller support structure 34 includes round cans 82 that project inwardly from the housing 38 and have respective open ends 84 through which the aligned sets of roller ends 30 project inwardly into the cooling chamber 40. The round cans 82 support the bearings 42 which rotatably support the aligned set of roller ends 30, and the housing 38 of the cooling unit 36 and the open ended round cans define a flow path of the cooling circuit that supplies water for cooling the aligned sets of roller ends and the bearings upon flow from the inlet 44 to the outlet 46 as previously described in connection with FIG. 5.

As shown in FIG. 6, the aligned set of roller ends 30 each have an end cap 86 that is secured to the sintered bonded fused silica of the associated roller, and each end cap has a projection 88 received by the inner race of the associated antifriction bearing 42 which is secured thereto by a retainer 90. A high temperature adhesive secures the end cap 86 to the roller end 30 and both this securement and the bearing 42 are cooled by the circulating water through the cooling chamber 40 while the air flow from the air supply 80 prevents hot air from the interior of the processing system from heating these components. The air supply 80 as shown includes a source 92 (FIG. 5) of pressurized air that feeds a supply tube 94 which in turn supplies the pressurized air to branch tubes 96 connected to fittings 98 that feed the pressurized air into tubes 100 that support the round cans 82 and feed the pressurized air into the round cans.

Figure 8:
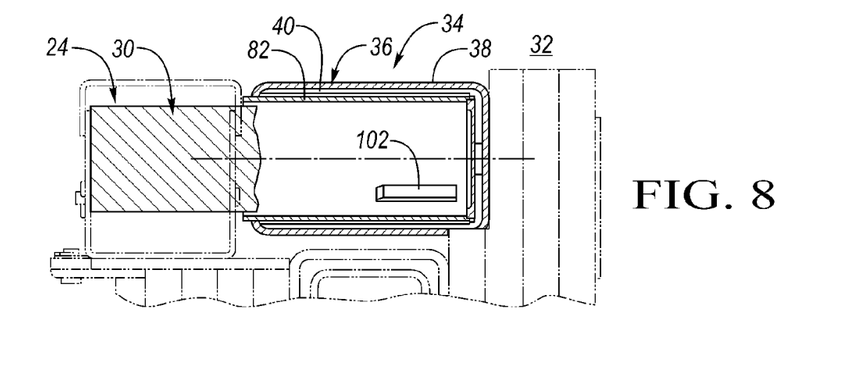
FIG. 8 is a sectional view taken generally along the direction of line 8-8 in FIG. 7 but with the roller end broken away and the bearing removed to illustrate the construction of each of a pair of bearing supports that support the bearing that rotatably supports the associated roller end.

As shown in FIGS. 7 and 8, bearing seats 102 on the interior of each round can 82 support the antifriction bearings 42 at their outer races to provide the rotatable support of the roller ends 30 whose projections 88 on the end caps 86 are received by the inner races of the bearings.

For a more specific disclosure of the transfer apparatus 69, see the United States patent application Ser. No. 14/929,799, which was filed concurrently herewith and has the title LIFT DEVICE FOR A GLASS PROCESSING SYSTEM, the entire disclosure of which is also hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. In a hot glass sheet processing system, the invention comprising:
    a roller conveyor extending along a direction of conveyance of the processing system and including a plurality of rollers having a set of roller ends that are located within a heated location of the system and aligned with each other along the direction of conveyance;
    a roller support structure located within the heated location of the system and having an elongated cooling unit including a housing defining a cooling chamber that receives and has bearings that rotatably support the aligned set of roller ends, and the cooling unit including a cooling circuit that supplies cooling fluid to the cooling chamber to provide cooling of the aligned set of roller ends and cooling of the bearings; and
    the roller support structure including round cans that project into the cooling chamber and have respective open ends through which the aligned set of roller ends respectively project into the cooling chamber, the round cans supporting the bearings which rotatably support the aligned set of roller ends, and the housing of the cooling unit and the open ended round cans defining a flow path of the cooling circuit that supplies water for cooling the aligned set of roller ends and the bearings.

2. The invention of claim 1 wherein the aligned set of roller ends have end caps respectively secured thereto and having support projections that are respectively rotatably supported by the bearings.

3. The invention of claim 2 wherein further including an air supply that provides air into the round cans to prevent heated air of the processing system from flowing into the cooling unit between the round cans and the aligned set of roller ends to prevent heating of the end caps and the bearings.

4. In a hot glass sheet processing system, the invention comprising:
   a roller conveyor extending along a direction of conveyance of the processing system and including a plurality of rollers having a set of ends that are located within a heated location of the system and aligned with each other along the direction of conveyance, each of said aligned roller ends having an end cap including a projection; and
   a roller support structure located within the heated location of the system and having an elongated cooling unit including a housing defining a cooling chamber, round cans that are supported by the housing projecting into the cooling chamber and cooperating with the housing to define a flow path, the round cans having open ends through which the aligned set of roller ends project into the cooling chamber, bearings mounted within the cans and rotatably supporting the projections of the end caps of the aligned set of roller ends, and the cooling unit including a cooling circuit that supplies water through the flow path within the cooling chamber to provide cooling of the aligned set of roller ends and cooling of the bearings.

5. In a hot glass sheet processing system, the invention comprising:
   a roller conveyor extending along a direction of conveyance of the processing system and including a plurality of rollers having a set of ends that are located within a heated location of the system and aligned with each other along the direction of conveyance, each of said aligned roller ends having an end cap including a projection; and
   a roller support structure located within the heated location of the system and having an elongated cooling unit including a housing defining a cooling chamber, round cans that are supported by the housing projecting into the cooling chamber and cooperating with the housing to define a flow path, the round cans having open ends through which the aligned set of roller ends project into the cooling chamber, bearings mounted within the cans and rotatably supporting the projections of the end caps of the aligned set of roller ends, and the cooling unit including a cooling circuit that supplies water through the flow path within the cooling chamber to provide cooling of the aligned set of roller ends and cooling of the bearings; and
   an air supply that supplies air into the cans to prevent heated air of the processing system from flowing into the cooling unit and heating the aligned set off roller ends and the bearings.

6. The invention of claim 1 wherein the cooling circuit supplies a liquid that provides the cooling of the aligned set of roller ends and the bearings.

7. The invention of claim 6 wherein the cooling circuit supplies water that provides the cooling of the aligned set of roller ends and the bearings.

8. The invention of claim 7 wherein the cooling circuit supplies a mixture of the water and an antifreeze that provides the cooling of the aligned set of roller ends and the bearings.

9. The invention of claim 7 wherein the roller support structure also includes an air supply that prevents heated air of the processing system from flowing into the cooling unit and heating the aligned set of roller ends and the bearings.

10. The invention of claim 1 wherein the cooling circuit supplies a mixture of water and an antifreeze that provides the cooling of the aligned set of roller ends and the hearings.

11. The invention of claim 10 wherein the roller support structure also includes an air supply that prevents heated air of the processing system from flowing into the cooling unit and heating the aligned set of roller ends and the bearings.

* * * * *

UNITED STATES PATENT AND TRADEMARK OFFICE
CERTIFICATE OF CORRECTION

PATENT NO. : 9,758,421 B2
APPLICATION NO. : 14/929763
DATED : September 12, 2017
INVENTOR(S) : James P. Schnabel, Jr. et al.

Page 1 of 1

It is certified that error appears in the above-identified patent and that said Letters Patent is hereby corrected as shown below:

In the Claims

Column 8, Line 15, Claim 5:
After "heating the aligned set"
Delete "off" and
Insert -- of --.

Column 8, Line 33, Claim 10:
After "set of roller ends and the"
Delete "hearings" and
Insert -- bearings --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*